US006621642B2

(12) United States Patent
Hagimori

(10) Patent No.: US 6,621,642 B2
(45) Date of Patent: Sep. 16, 2003

(54) TAKING LENS DEVICE

(75) Inventor: Hitoshi Hagimori, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/867,013

(22) Filed: May 29, 2001

(65) Prior Publication Data

US 2003/0058549 A1 Mar. 27, 2003

(30) Foreign Application Priority Data

May 30, 2000 (JP) ........................................ 2000-160245
Dec. 4, 2000 (JP) ........................................ 2000-368341

(51) Int. Cl.$^7$ ............................................. G02B 15/14
(52) U.S. Cl. ...................................... 359/682; 359/689
(58) Field of Search ................................ 359/689, 683, 359/676, 682

(56) References Cited

U.S. PATENT DOCUMENTS 5,745,301 A    4/1998 Betensky et al. ............ 359/689
6,124,984 A *  9/2000 Shibayama et al. ......... 359/689

FOREIGN PATENT DOCUMENTS

| JP | 01-191820 A | 8/1989 |
| JP | 05-323190 A | 12/1993 |
| JP | 06-214159 A | 8/1994 |
| JP | 10-227975 A | 8/1998 |
| JP | 11-072702 A | 3/1999 |

* cited by examiner

Primary Examiner—Scott J. Sugarman
(74) Attorney, Agent, or Firm—Sidley Austin Brown & Wood LLP

(57) ABSTRACT

Taking lens device has zoom lens system comprised of plurality of lens units and achieves zooming by varying unit-to-unit distances and image sensor that converts optical image formed by zoom lens system into electrical signal. Zoom lens system comprised of, from the object side, first lens unit having negative optical power, second lens unit having positive optical power, and third lens unit having positive optical power. First, second, and third lens units are each comprised of one lens element, and at least the first and second lens units are moved along the optical axis during zooming. Following conditional formula is fulfilled: $0.2 < tW_{2-3}/fW < 1.2$, where $tW_{2-3}$ represents optical path length from the most image-side lens surface in second lens unit to the most object-side lens surface in third lens unit at wide-angle end, and fW represents focal length of the entire zoom lens system at wide-angle end.

25 Claims, 9 Drawing Sheets

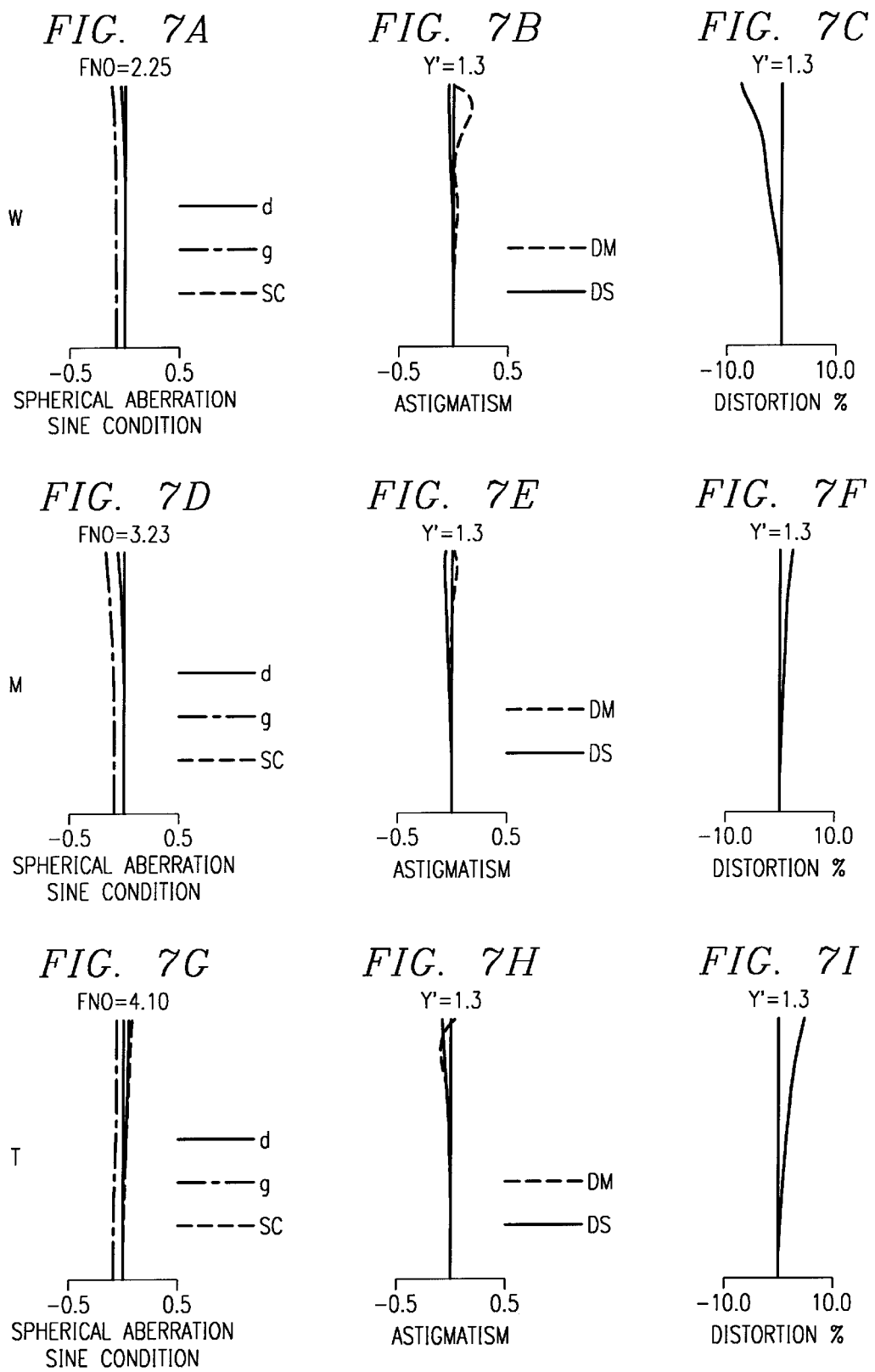

FNO=2.33
W
— d
—·— g
---- SC
-0.5   0.5
SPHERICAL ABERRATION
SINE CONDITION

Y'=1.3
---- DM
— DS
-0.5   0.5
ASTIGMATISM

Y'=1.3
-10.0   10.0
DISTORTION %

FNO=3.27
M
— d
—·— g
---- SC
-0.5   0.5
SPHERICAL ABERRATION
SINE CONDITION

Y'=1.3
---- DM
— DS
-0.5   0.5
ASTIGMATISM

Y'=1.3
-10.0   10.0
DISTORTION %

FNO=4.10
T
— d
—·— g
---- SC
-0.5   0.5
SPHERICAL ABERRATION
SINE CONDITION

Y'=1.3
---- DM
— DS
-0.5   0.5
ASTIGMATISM

Y'=1.3
-10.0   10.0
DISTORTION %

FNO=2.53
W
—— d
—·—· g
----- SC
−0.5  0.5
SPHERICAL ABERRATION
SINE CONDITION

Y'=1.3
----- DM
—— DS
−0.5  0.5
ASTIGMATISM

Y'=1.3
−10.0  10.0
DISTORTION %

FNO=3.38
M
—— d
—·—· g
----- SC
−0.5  0.5
SPHERICAL ABERRATION
SINE CONDITION

Y'=1.3
----- DM
—— DS
−0.5  0.5
ASTIGMATISM

Y'=1.3
−10.0  10.0
DISTORTION %

FNO=4.10
T
—— d
—·—· g
----- SC
−0.5  0.5
SPHERICAL ABERRATION
SINE CONDITION

Y'=1.3
----- DM
—— DS
−0.5  0.5
ASTIGMATISM

Y'=1.3
−10.0  10.0
DISTORTION %

FNO=2.11
W
— d
—·— g
----- SC
-0.5   0.5
SPHERICAL ABERRATION
SINE CONDITION

Y'=1.8
----- DM
——— DS
-0.5   0.5
ASTIGMATISM

Y'=1.8
-10.0   10.0
DISTORTION %

FNO=3.16
M
— d
—·— g
----- SC
-0.5   0.5
SPHERICAL ABERRATION
SINE CONDITION

Y'=1.8
----- DM
——— DS
-0.5   0.5
ASTIGMATISM

Y'=1.8
-10.0   10.0
DISTORTION %

FNO=4.10
T
— d
—·— g
----- SC
-0.5   0.5
SPHERICAL ABERRATION
SINE CONDITION

Y'=1.8
----- DM
——— DS
-0.5   0.5
ASTIGMATISM

Y'=1.8
-10.0   10.0
DISTORTION %

FNO=2.33
W
—— d
—·— g
----- SC
SPHERICAL ABERRATION
SINE CONDITION

Y'=2.2
----- DM
—— DS
ASTIGMATISM

Y'=2.2
DISTORTION %

FNO=3.17
M
—— d
—·— g
----- SC
SPHERICAL ABERRATION
SINE CONDITION

Y'=2.2
----- DM
—— DS
ASTIGMATISM

Y'=2.2
DISTORTION %

FNO=4.10
T
—— d
—·— g
----- SC
SPHERICAL ABERRATION
SINE CONDITION

Y'=2.2
----- DM
—— DS
ASTIGMATISM

Y'=2.2
DISTORTION %

FNO=1.94

W
—— d
—·— g
---- SC
-0.5    0.5
SPHERICAL ABERRATION
SINE CONDITION

Y'=2.2

---- DM
—— DS
-0.5    0.5
ASTIGMATISM

Y'=2.2

-10.0    10.0
DISTORTION %

FNO=3.08

M
—— d
—·— g
---- SC
-0.5    0.5
SPHERICAL ABERRATION
SINE CONDITION

Y'=2.2

---- DM
—— DS
-0.5    0.5
ASTIGMATISM

Y'=2.2

-10.0    10.0
DISTORTION %

FNO=4.10

T
—— d
—·— g
---- SC
-0.5    0.5
SPHERICAL ABERRATION
SINE CONDITION

Y'=2.2

---- DM
—— DS
-0.5    0.5
ASTIGMATISM

Y'=2.2

-10.0    10.0
DISTORTION %

TAKING LENS DEVICE

This application is based on Japanese Patent Applications Nos. 2000-160245 and 2000-368341, filed on May 30, 2000 and Dec. 4, 2000, respectively, the contents of which are hereby incorporated by reference.

BACKGROUND OF THE INVENTION

1. Field of the Invention

The present invention relates to a taking lens device. More specifically, the present invention relates to a taking lens device that optically takes in an image of a subject through an optical system and then outputs the image as an electrical signal by means of an image sensor, for ex ample, a taking lens device that is used as a main component of a digital still camera, a digital video camera, or a camera that is incorporated in or externally fitted to a device such as a digital video unit, a personal computer, a mobile computer, a portable telephone, or a personal digital assistant (PDA). The present invention relates particularly to a taking lens device which is provided with a compact, high-zoom-ratio zoom lens system.

2. Description of Prior Art

In recent years, with the explosive spread of portable telephones and portable information terminals called PDAs an increasing number of models have been incorporating a compact digital camera, or digital video unit employing a CCD (charge-coupled device) or CMOS (complementary metal-oxide semiconductor) sensor as an image sensor. When such a digital camera, or the like, is miniaturized using an image sensor with a relatively small effective image-sensing surface area, its optical system also needs to be miniaturized accordingly. As compact zoom lenses with a small number of lens elements for use in a digital camera, or like, provided with an image sensor with a small effective area, Japanese Patent Application Laid-Open No. H11-72702, Japanese Patent Application Laid Open Open No. H1-191820, U.S. Pat. No. 5,745, 301, and others, propose a three-unit zoom lenses of a negative-positive-positive type composed of, from the object t side, a first lens unit having a negative optical power, a second lens unit having a positive optical power, and a third lens unit having a positive optical power. This type of lens includes a minimum number of movable lens units and has a simple mechanical structure, and is thus suitable as a low-cost zoom lens.

In the zoom lens proposed in Japanese Patent Application Laid-Open No. H11-72702 mentioned above, the individual lens units are each composed of one lens element, and thus, the entire zoom lens is composed of three lens elements in total. However, this arrangement includes a diffractive optical element, and therefore the zoom lens, when used as a taking lens system, suffers from ghosts caused by second- and third-order light. This makes the zoom lens somewhat unsatisfactory in image-sensing performance. Moreover, the aerial distance between the second and the third lens units is considerably long at the wide-angle end. This makes the optical total length of the zoom lens unduly long.

In the zoom lens proposed in Japanese Patent Application Laid-Open No. H1-191820 mentioned above, the first lens unit is composed of one lens element, the second lens unit is composed of one lens element, and the third lens unit is composed of two lens elements; thus, the entire zoom lens is composed of four lens elements in total. In this zoom lens, the third lens unit is given a relatively strong optical power, and therefore requires two lens elements. This makes it difficult to reduce the cost and size of the zoom lens. Moreover, this zoom lens offers a zoom ratio as low as about 2× and a dark f-number. In the zoom lens proposed in U.S. Pat. No. 5,745,301, mentioned above, the first lens unit is kept stationary during zooming. As a result, the zoom lens offers a zoom ratio as low as about 2×, at most.

SUMMARY OF THE INVENTION

An object of the present invention is to provide an optical, or a taking lens device that allows both cost reduction and miniaturization and that is provided with a high-zoom-ratio zoom lens system that offers a bright f-number and a zoom ratio as high as about 3×.

To achieve the above object, according to one aspect of the present invention, an optical, or a taking lens device is provided with: a zoom lens system that is comprised of a plurality of lens units and that achieves zooming by varying the unit-to-unit distances; and an image sensor that converts an optical image formed by the zoom lens system into an electrical signal. The zoom lens system comprises, from the object side thereof to an image side thereof, a first lens unit having a negative optical power, a second lens unit having a positive optical power, and a third lens unit having a positive optical power. Here, the first, the second, and the third lens units are each comprised of one lens element, and at least the first and second lens units are moved along the optical axis during zooming. Moreover the following conditional formula is fulfilled:

$$0.2 < tW_{2\text{-}3}/fW < 1.2$$

where $tW_{2\text{-}3}$ represents the optical path length from the most image-side lens surface in the second lens unit to the most object-side lens surface in the third lens unit at the wide-angle end; and fW represents the focal length of the entire zoom lens systems at the wide-angle end.

According to another aspect of the present invention, an optical, or a taking lens device is provided with a zoom lens system that is comprised of a plurality of lens units and that achieves zooming by varying the unit-to-unit distances; and an image sensor that converts an optical image formed by the zoom lens system into an electrical signal. The zoom lens system is comprised of, from the object side thereof to the image side thereof, a first lens unit having a negative optical power, a second lens unit having a positive optical power, and a third lens unit having a positive optical power. Here, at least the first and second lens units are moved along the optical axis during zooming. Moreover, the following conditional formula is fulfilled:

$$7 < f3/fW < 20$$

where f3 represents the focal length of the third lens unit; and fW represents the focal length of the entire zoom lens system at the wide-angle end.

According to another aspect of the present invention, an optical, or a taking lens device is provided with: a zoom lens system that is comprised of a plurality of lens units and that achieves zooming by varying the unit-to-unit distances; and an image sensor that converts an optical image formed by the zoom lens system into an electrical signal. The zoom lens system comprises, from the object side thereof to the image side thereof, a first lens unit having a negative optical power, a second lens unit having a positive optical power, and a third lens unit having a positive optical power. Here, the first lens unit is comprised of one negative lens element having a sharp curvature toward the image side. Moreover, the following conditional formula is fulfilled:

$$0.2 < t1/Y' < 1.2$$

where t1 represents the axial thickness of the first lens unit from the most object-side lens surface thereof to the most image-side lens surface thereof; and Y' the maximum image height.

BRIEF DESCRIPTION OF THE DRAWINGS

This and other objects and features of the present invention will become clear from the following description, taken in conjunction with the preferred embodiments with reference to the accompanying drawings in which:

FIGS. 7A to 7I are aberration diagrams of Example 1;

DESCRIPTION OF THE PREFERRED EMBODIMENTS

Figure 1:
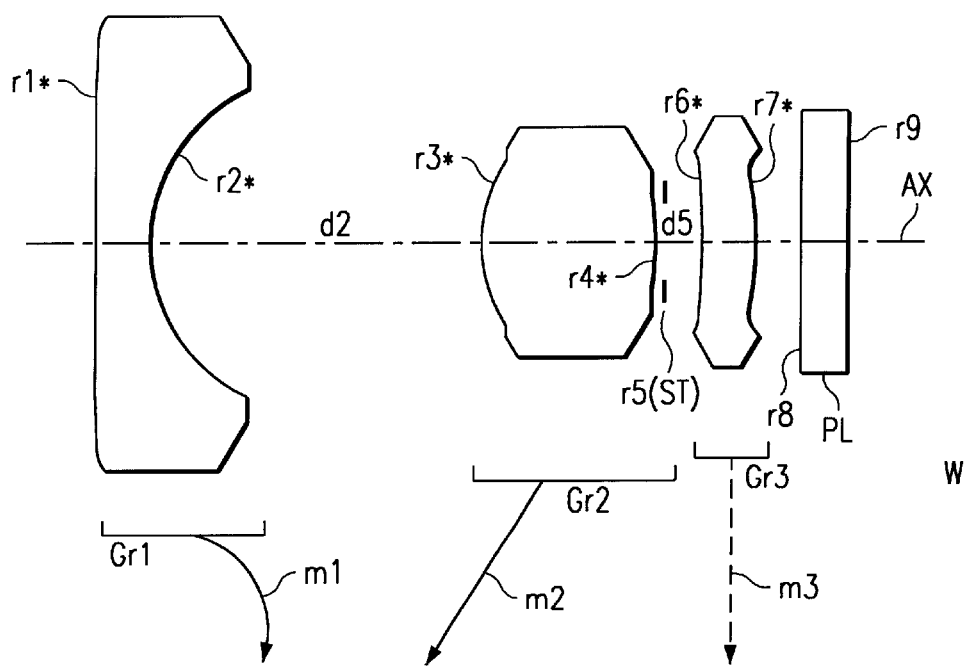
FIG. 1 is a lens arrangement diagram of a first embodiment (Example 1) of the invention.
Figure 2:
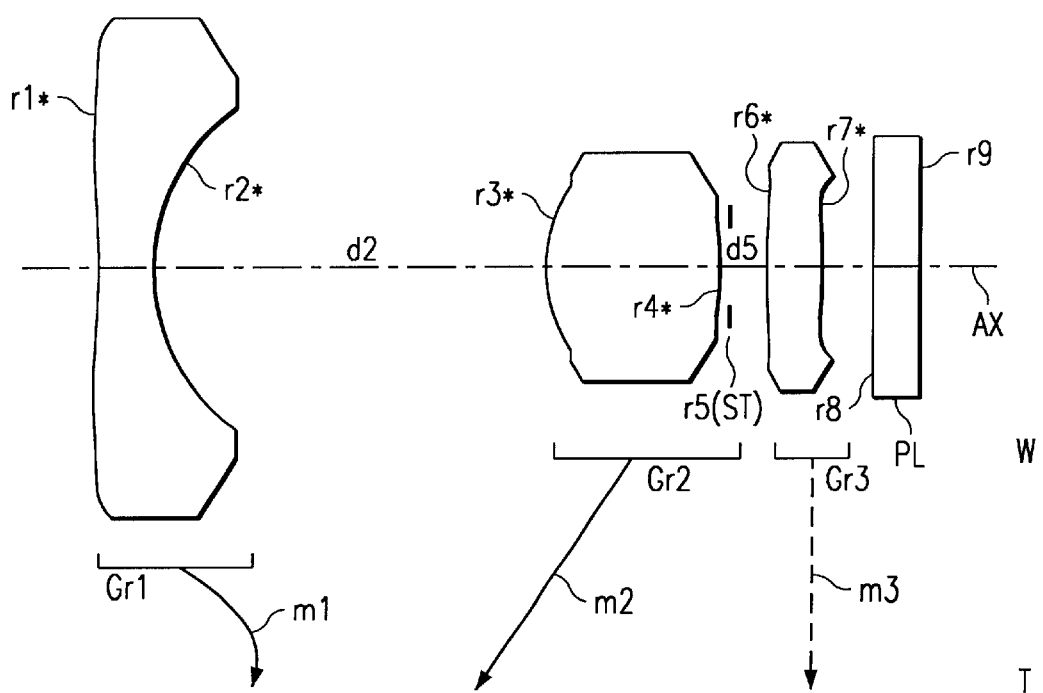
FIG. 2 is a lens arrangement diagram of a second embodiment (Example 2) of the invention
Figure 3:
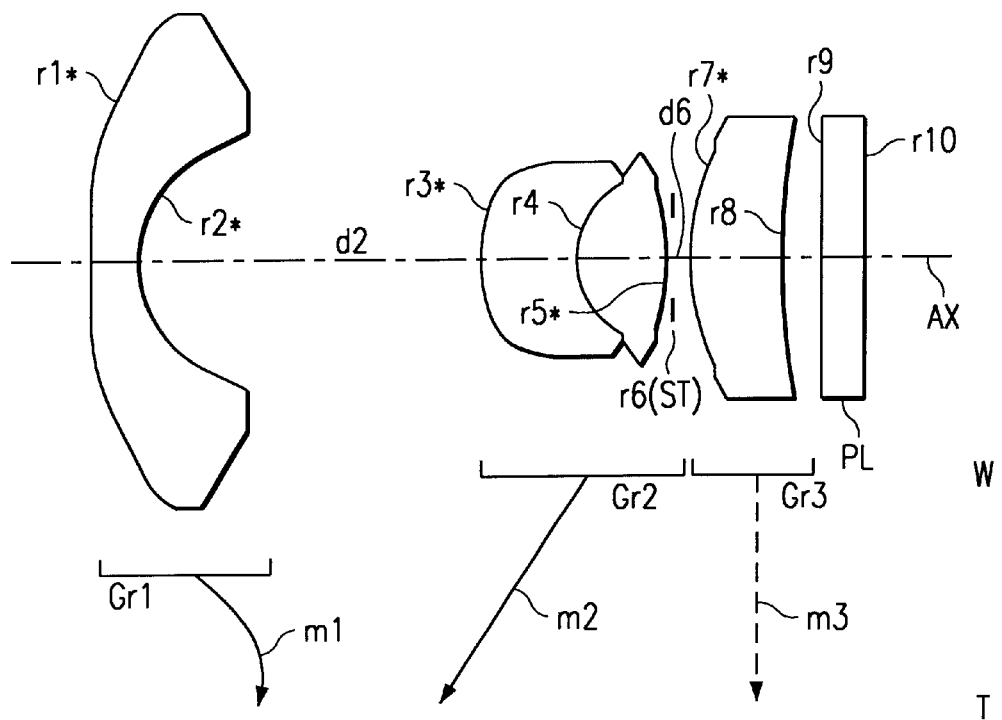
FIG. 3 is a lens arrangement diagram of a third embodiment (Example 3) of the invention.
Figure 4:
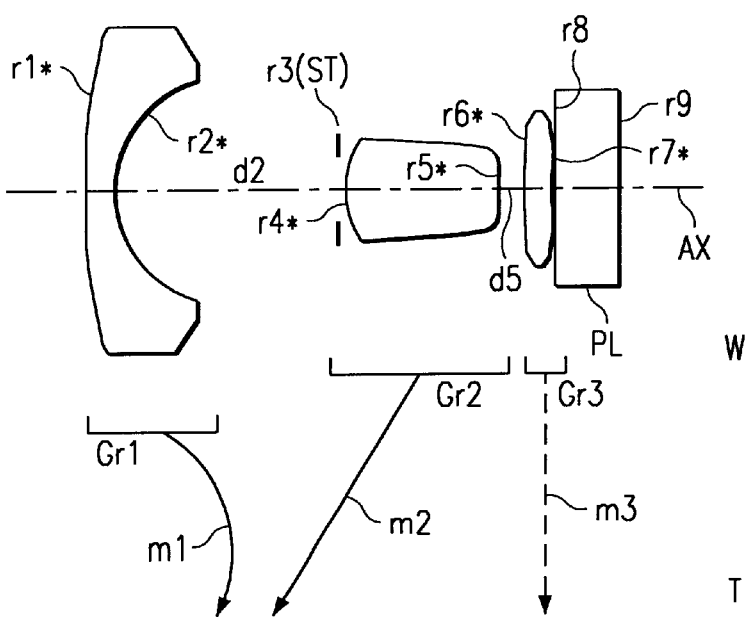
FIG. 4 is a lens arrangement diagram of a fourth embodiment (Example 4) of the invention.
Figure 5:
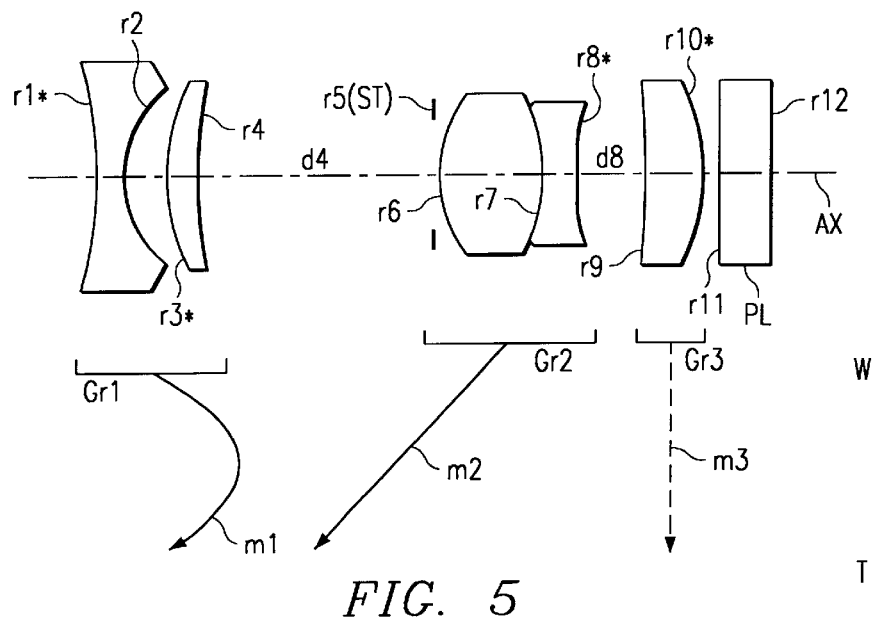
FIG. 5 is a lens arrangement diagram of a fifth embodiment (Example 5) of the invention.
Figure 6:
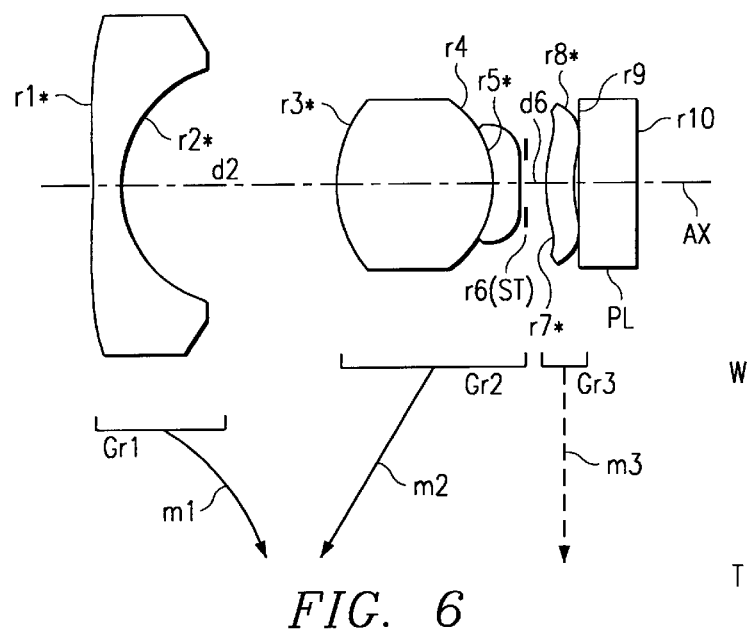
FIG. 6 is a lens arrangement diagram of a sixth embodiment (Example 6) of the invention.
Figure 13:
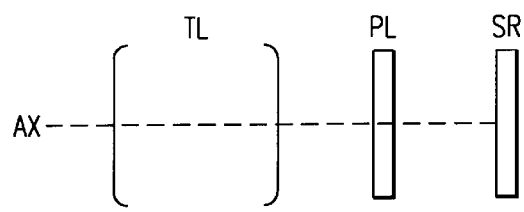
FIG. 13 is a diagram schematically illustrating the outline of the optical construction of a taking lens device embodying the invention.
Figure 8A:
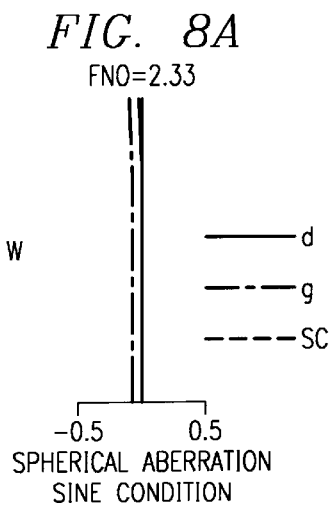
FIGS. 8A to 8I are aberration diagrams of Example 2.
Figure 8B:
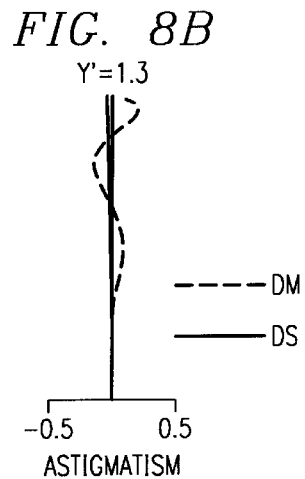
Figure 8C:
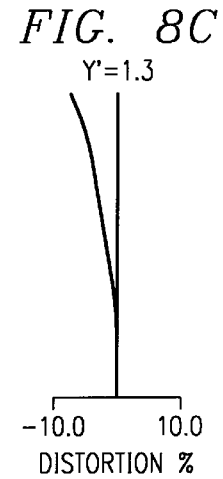
Figure 8D:
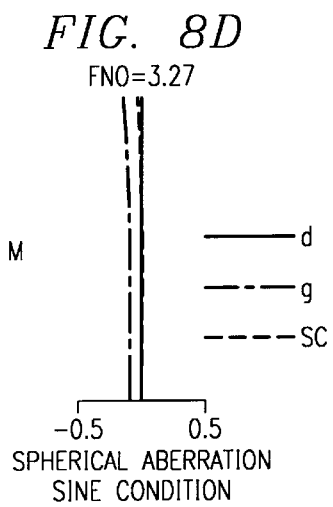
Figure 8E:
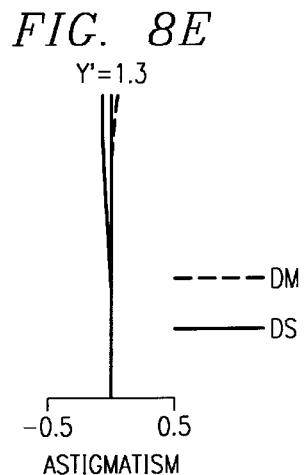
Figure 8F:
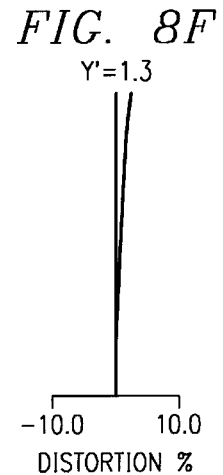
Figure 8G:
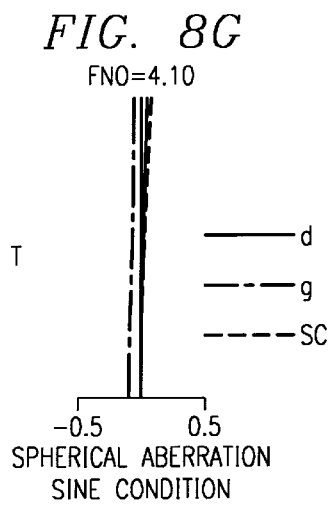
Figure 8H:
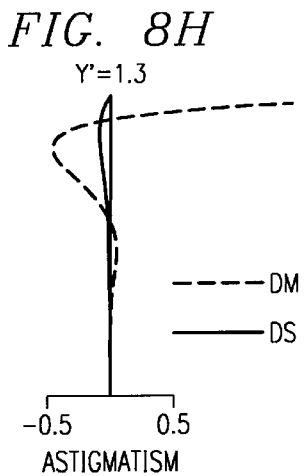
Figure 8I:
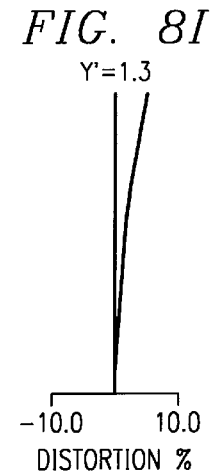
Figure 9A:
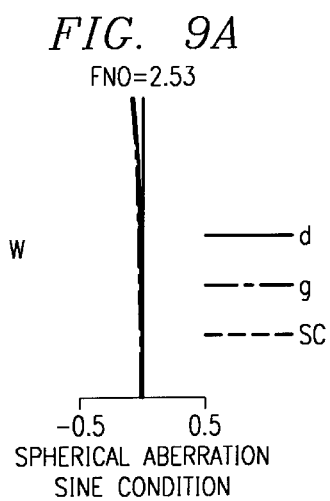
FIGS. 9A to 9I are aberration diagrams of Example 3.
Figure 9B:
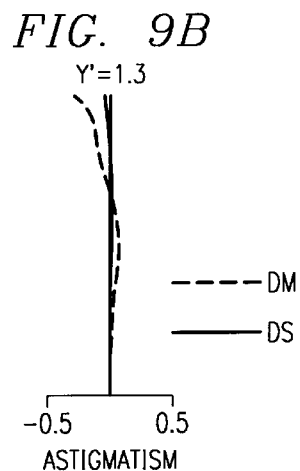
Figure 9C:
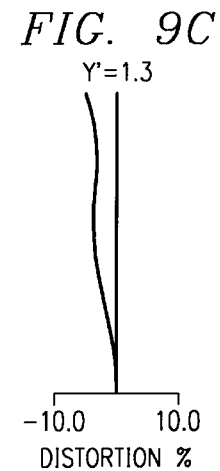
Figure 9D:
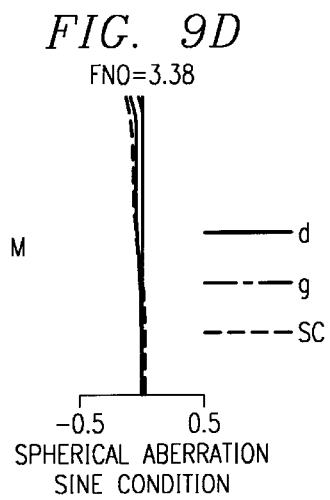
Figure 9E:
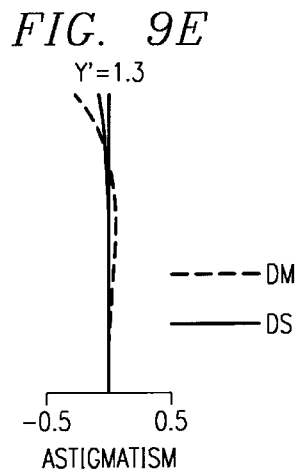
Figure 9F:
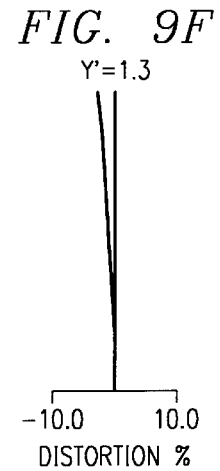
Figure 9G:
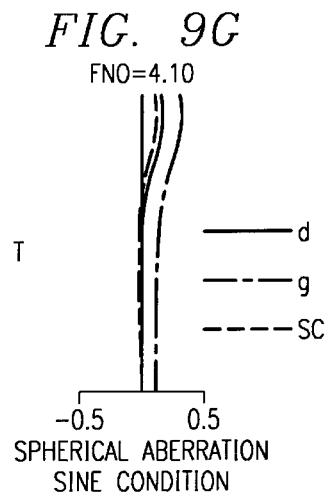
Figure 9H:
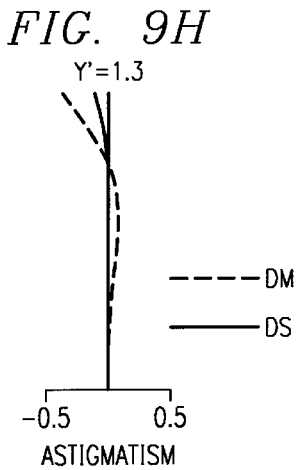
Figure 9I:
Figure 10A:
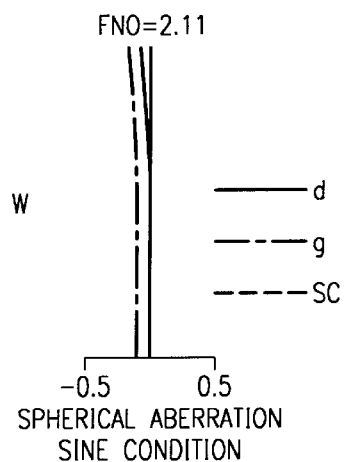
FIGS. 10A to 10I are aberration diagrams of Example 4.
Figure 10B:
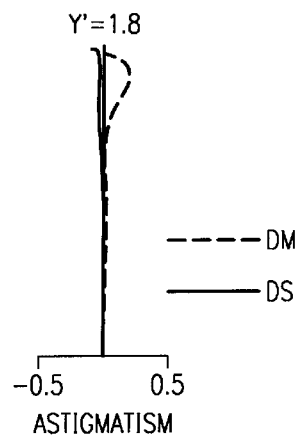
Figure 10C:
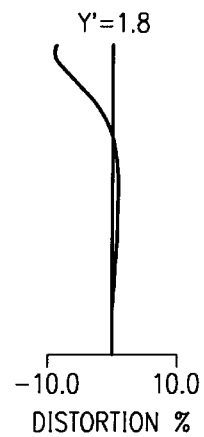
Figure 10D:
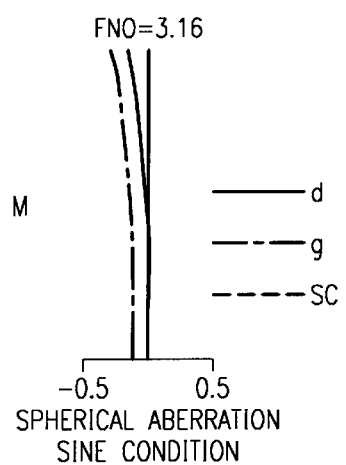
Figure 10E:
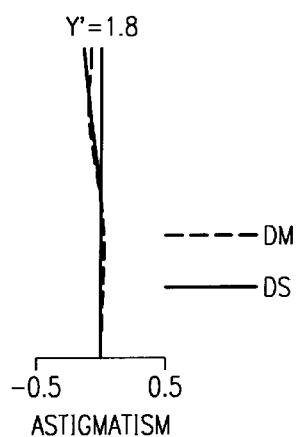
Figure 10F:
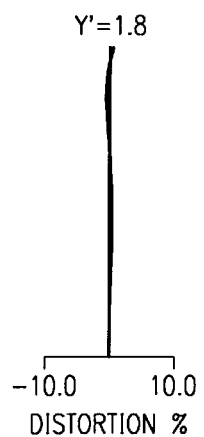
Figure 10G:
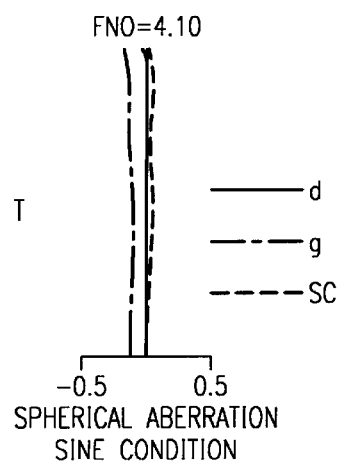
Figure 10H:
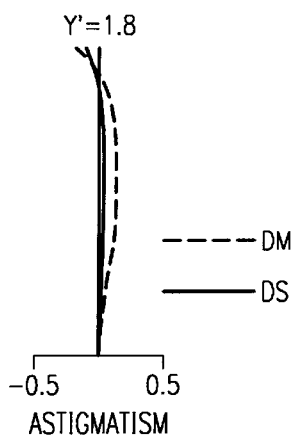
Figure 10I:
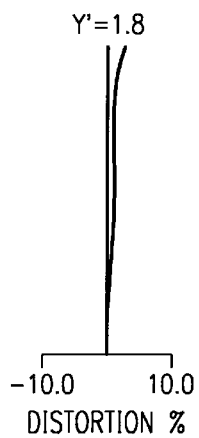
Figure 11A:
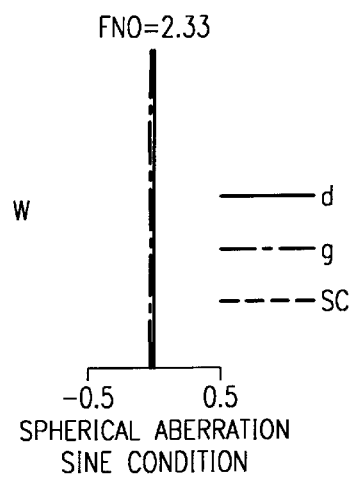
FIGS. 11A to 11I are aberration diagrams of Example 5.
Figure 11B:
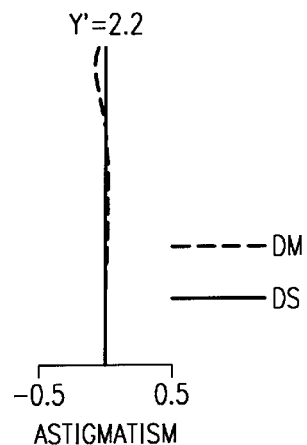
Figure 11C:
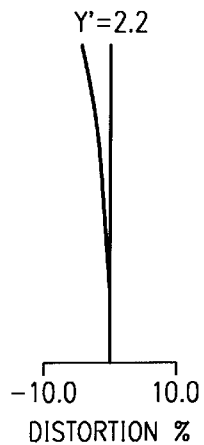
Figure 11D:
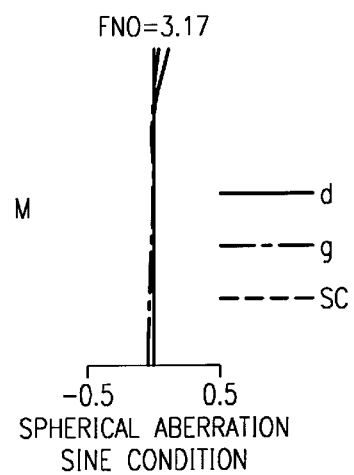
Figure 11E:
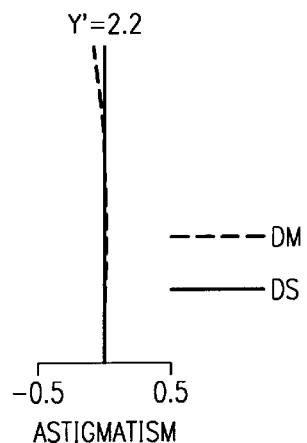
Figure 11F:
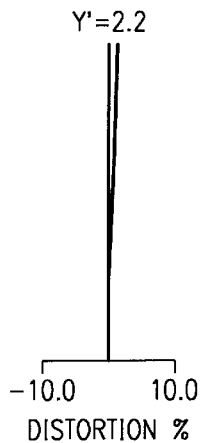
Figure 11G:
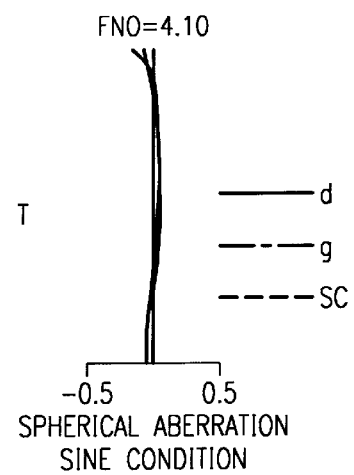
Figure 11H:
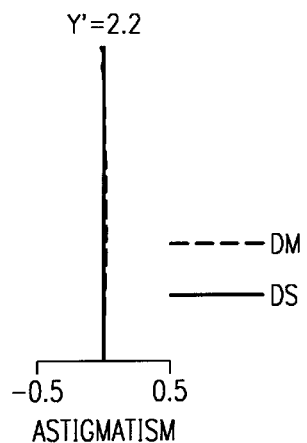
Figure 11I:
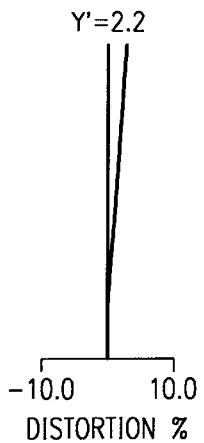
Figure 12A:
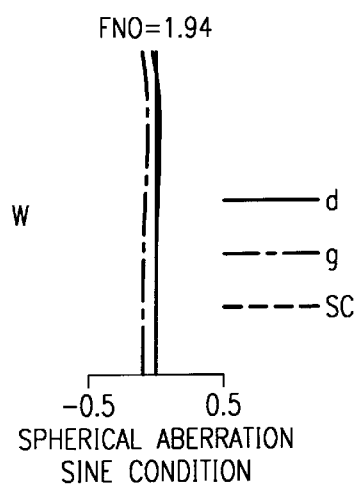
FIGS. 12A to 12I are aberration diagrams of example 6.
Figure 12B:
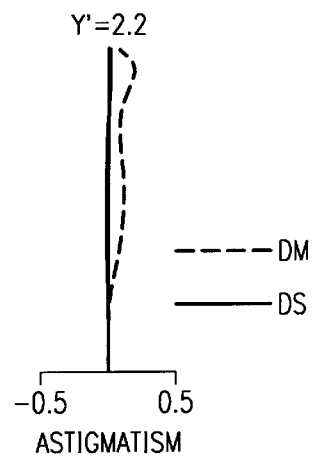
Figure 12C:
Figure 12D:
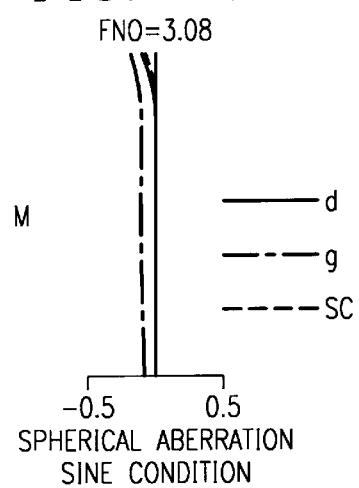
Figure 12E:
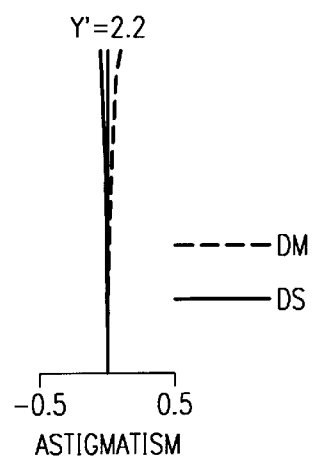
Figure 12F:
Figure 12G:
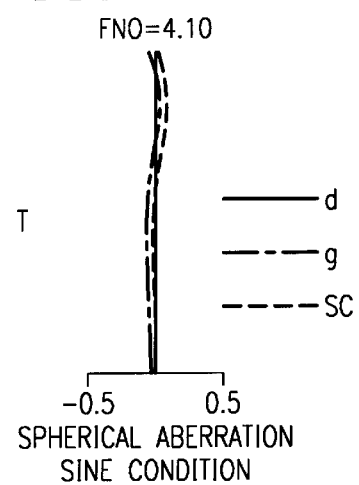
Figure 12H:
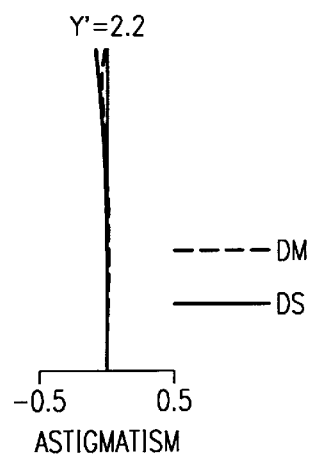
Figure 12I:
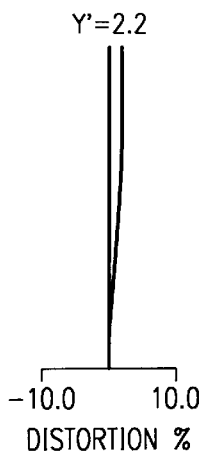

Hereinafter, optical or taking lens devices embodying the present invention will be described with reference to the drawings and the optical or taking lens devices will be referred to as taking lens devices. A taking lens device optically takes in an image of a subject and then outputs the image as an electrical signal. A taking lens device is used as a main component of a camera which is employed to shoot a still or moving picture of a subject, for example a digital still camera, a digital video camera, or a camera that is incorporated in or externally fitted to a device such as a digital video unit, a personal computer, a mobile computer, a portable telephone, or a personal digital assistant (PDA). For example as shown in FIG. 13, a taking lens device is comprised of, from the object (subject) side, a taking lens system TL that forms an optical image of an object, a plane-parallel plate PL that functions as an optical low-pass filter or the like, and an image sensor SR that converts the optical image formed by the taking lens system TL into an electrical signal.

In all of the embodiments described hereinafter, the taking lens system TL is built as a zoom lens system comprised of a plurality of lens units wherein zooming is achieved by moving two or more lens units along the optical axis AX in such a way that their unit-to-unit distances vary. The image sensor SR is realized, for example, with a solid-state image sensor such as a CCD or CMOS sensor having a plurality of pixels, and, by this image sensor SR, the optical image formed by the zoom lens system is converted into an electrical signal. The optical image to be formed by the zoom lens system has its spatial frequency characteristics adjusted by being passed through the low-pass filter PL that has predetermined cut-off frequency characteristics that are determined by the pixel pitch of the image sensor SR. This helps minimize so-called aliasing noise that appears when the optical image is converted into an electrical signal. The signal produced by the image sensor SR is subjected, as required, to predetermined digital image processing, image compression, and other processing, and is then recorded as a digital image signal, in a memory (such as a semiconductor memory or an optical disk) or, if required, is transmitted to another device by way of a cable or after being converted into an infrared signal.

FIGS. 1 to 6 are lens arrangement diagrams of the zoom lens system used in a first to a sixth embodiment, respectively, of the present invention, each showing the lens arrangement at the wide-angle end W in an optical sectional view. In each lens arrangement diagram, an arrow mj (where j=1, 2,3) schematically indicates the movement of the j-th lens unit Grj during zooming from the wide-angle end W to the telephoto end T (a broken-line arrow mj, however, indicates that the corresponding lens unit is kept stationary during zooming). Moreover, in each lens arrangement diagram, ri (where i=1, 2, 3, . . . ) indicates the i-th surface from the object (subject) side, and a surface ri marked with an asterisk (*) is an aspherical surface, di (where i=1, 2, 3, . . . ) indicates the i-th axial distance from the object side, though only those which vary with zooming, called variable distances, are shown here.

In all of the first to the sixth embodiments, the zoom lens system is built as a three-unit zoom lens comprised of, from the object side, a first lens unit Gr1 having a negative optical power, a second lens unit Gr2 having a positive optical power, and a third lens unit Gr3 having a positive optical power, wherein zooming is achieved by varying the distances between those lens units. In addition, designed as a zoom lens system compatible with ½- to ¼-inch formats used in digital cameras, digital video units, and the like, provided with a solid-state image sensor (for example, a CCD), the zoom lens system also has a flat glass plate PL, which is a glass plane-parallel plate that functions as an optical low-pass filter or the like, disposed on the image side thereof. In all of the embodiments, during zooming, the third lens unit Gr3 and the flat glass plate PL are kept stationary, and the first and the second lens units Gr1, Gr2 are moved along the optical axis AX. Moreover, the second lens unit Gr2 has an aperture stop ST disposed at the image-side end (FIGS. 1 to 3 and 6) or at the object-side end (FIGS. 4 and 5) thereof This aperture stop ST moves together with the second lens unit Gr2 during zooming.

In the first, the second, and the fourth embodiments (FIGS. 1, 2, and 4, respectively), the individual lens units Gr1, Gr2, Gr3 are each comprised of one lens element. In the third, the fifth, and the sixth embodiments (FIGS. 3, 5, and 6, respectively), the second lens unit Gr2 is comprised of one cemented lens element consisting of one negative lens element and one positive lens element cemented together; in the third and the sixth embodiments, the first lens unit Gr1 is comprised of one negative lens element; and, in the fifth embodiment, the first lens unit Gr1 is comprised of one negative lens element and one positive lens element. In arrangements of a negative-positive-positive type like these, by building the individual lens units Gr1, Gr2, Gr3 each out of as few lens elements as possible in this way, it is possible to achieve both cost reduction and miniaturization.

In the design of a zoom lens system compatible with an image sensor SR with a relatively small effective image-sensing surface area, it is essential to reduce the absolute size of the zoom lens system itself The most effective way to shorten the total length of the zoom lens system is to shorten the optical axis lengths of the individual lens units Gr1, Gr2, Gr3. The most effective way to shorten the optical axis lengths of the individual lens units Gr1, Gr2, Gr3 is to reduce the number of lens elements constituting each lens unit. Accordingly, as in the first, the second, and the fourth embodiments, in a zoom lens system of a negative-positive-positive type, by building the individual lens units Gr1, Gr2, Gr3 each out of one lens element, it is possible to realize a zoom lens system that is very compact but nevertheless offers a zoom ratio as high as 3x. In a zoom lens system of a negative-positive-positive type wherein at least the first and the second lens units Gr1, Gr2 are moved along the optical axis AX during zooming, it is preferable that, as in the first, the second, and the fourth embodiments, the individual lens units Gr1, Gr2, Gr3 are each comprised of one lens element and in addition that conditional formula (1) below be fulfilled. This makes it possible to realize a low-cost, compact zoom lens system that offers a bright f-number and a high zoom ratio.

$$0.2 < tW_{2-3}/fW < 1.2 \qquad (1)$$

where $tW_{2-3}$ represents the optical path length from the most image-side lens surface in the second lens unit Gr2 to the most object-side lens surface in the third lens unit Gr3 at the wide-angle end W; and fW represents the focal length of the entire zoom lens system at the wide-angle end W.

If the lower limit of conditional formula (1) were to be transgressed, the second lens unit Gr2 would interfere with the third lens unit Gr3 at the wide-angle end W, and this would complicate the mechanical structure of lens barrels. By contrast, if the upper limit of conditional formula (1) were to be transgressed, the optical total length would be long and in addition, the first lens unit Gr1 would be so far away from the image-sensing surface that the first lens unit Gr1 would need to be made larger in effective diameter to secure the desired illuminance.

As in all of the embodiments, it is preferable that the third lens unit Gr3 be kept stationary during zooming. In a zoom lens system of a negative-positive-positive type wherein the first and the second lens units Gr1, Gr2 are moved along the optical axis AX during zooming, by keeping the third lens unit Gr3 stationary, it is possible to reduce both the cost and size of the zoom lens system. The smaller the number of lens units that are moved during zooming, the simpler the mechanical structure of lens barrels can be. Thus, by reducing the number of movable lens units, it is possible to simplify the mechanical structure and reduce the cost effectively. In a zoom lens system of a negative-positive-positive type, keeping the third lens unit Gr3 stationary makes two movable lens units, which is theoretically the minimum number possible in a zoom lens system. This helps simplify the mechanical structure and thereby reduce both the cost and size of the zoom lens system.

In a zoom lens system of a negative-positive-positive type wherein at least the first and the second lens units Gr1, Gr2 are moved along the optical axis AX during zooming, it is preferable that conditional formula (2) below be fulfilled, and it is further preferable that both the third lens unit Gr3 be kept stationary during zooming and add that conditional formula (2) be fulfilled. It is especially preferable that the individual lens units Gr1, Gr2, Gr3 are each comprised of one lens element and in addition that conditional formulae (1) and (2) both be fulfilled. Fulfilling conditional formula (2) makes it possible to realize a zoom lens system that is more compact but nevertheless offers satisfactory performance.

$$7 < f3/fW < 20 \qquad (2)$$

where f3 represents the focal length of the third lens unit (Gr3); and fW represents the focal length of the entire zoom lens system at the wide-angle end W.

In modern image sensors, it is common to provide microlenses, one for each of the pixels thereof, to secure the desired amount of light in order to compensate for the loss of sensitivity resulting from increasingly smaller pixel pitches. In older image sensors, those microlenses are usually so arranged as to point toward infinity collectively. In more recent image sensors, the microlenses are increasingly being arranged so as to point toward a closer point by slanting the axes of the microlenses with respect to the effective area of the image sensor. This means that the rays reaching the image sensor do not necessarily have to be telecentric. Accordingly, there is no need to give the third lens unit Gr3 an especially strong optical power, and this increases flexibility in the design of the taking lens system TL.

From this perspective, fulfilling conditional formula (2) would allow the third lens unit Gr3 to have a relatively weak positive optical power, and thus it would be possible to realize a compact, high-performance zoom lens system. If the lower limit of conditional formula (2) were to be transgressed, the optical power of the third lens unit Gr3 would be so strong that it would be difficult to correct off-axial curvature of field, in particular, in the portion of the zoom range from the middle position M to the telephoto end T. By contrast, if the upper limit of conditional formula (2) were to be transgressed, the optical power of the third lens unit Gr3 would be so weak that it would be difficult to secure a zoom ratio of about 3x.

In a zoom lens system of a negative-positive-positive type, the first lens unit Gr1 includes at least one negative lens element. With respect to the axial thickness of the first lens unit Gr1, it is preferable that conditional formula (3) below be fulfilled. Moreover, in a zoom lens system of a negative-positive-positive type, the second lens unit Gr2 includes at least one positive lens element. With respect to the axial thickness of the second lens unit Gr2, it is preferable that conditional formula (4) below be fulfilled. Conditional formulae (3) and (4) define conditions that are effective in making the zoom lens system compact, and fulfilling both conditional formulae (3) and (4) would make it possible to realize an extremely compact zoom lens system. Fulfilling all of conditional formulae (1) to (4) is further effective.

$$0.2 < t1/Y' < 1.2 \qquad (3)$$

where t1 represents the axial thickness of the first lens unit Gr1 from the most object-side lens surface thereof to the most image-side lens surface thereof; and Y' represents the maximum image height.

If the lower limit of conditional formula (3) were to be transgressed, the axial thickness of the, negative lens element constituting the first lens unit Gr1 would be so small that the lens element, when made of glass, would be very prone to breakage or, when made of plastic, would cause a slack flow of the material in the molding process. In either case, it would be impossible to manufacture the lens element on a practical basis. By contrast, if the upper limit of conditional formula (3) were to be transgressed, the thickness of the first lens unit Gr1 would be so great that, with the resulting large optical total length, it would be impossible to achieve satisfactory compactness.

$$1 < t2/Y' < 4 \qquad (4)$$

where t2 represents the axial thickness of the second lens unit Gr2 from the most object-side lens surface thereof to the most image-side lens surface thereof; and y' represents the maximum image height.

If the lower limit of conditional formula (4) were to be transgressed, the axial thickness of the positive lens element constituting the second lens unit Gr2 would be so small that it would be impossible to secure the necessary edge thickness. This would make it impossible to manufacture the lens element on a practical basis. Moreover, the differences in the heights of axial rays between the front surface and the rear surface of the positive lens element provided in the second lens unit Gr2 would be so small that it would be difficult to correct the axial chromatic aberration that would have occurred at the front surface with the rear surface. By contrast, if the upper limit of conditional formula (4) were to be transgressed, the thickness of the second lens unit Gr2 would be so great that, with the resulting large optical total length, it would be impossible to achieve satisfactory compactness.

In a zoom lens system of a negative-positive-positive type, it is preferable that, as in the first to the fourth embodiment and the six embodiment, the first lens unit Gr1 be comprised of one negative lens element having a sharp curvature toward the image side thereof (i.e. having a sharper curvature on its image-side surface than on its object-side surface), and it is further preferable that this negative lens element fulfill conditional formula (3). This makes it possible to realize a high-performance zoom lens system with a short optical total length. In a negative-positive-positive type, which starts with a negative lens unit, the first lens unit Gr1 needs to be given a relatively strong negative optical power. However, if the first lens unit Gr1 is comprised of one negative lens element and the object-side surface of this lens element is given a strong negative optical power, the lens element bends the rays incident thereon so sharply that it is impossible to eliminate the resulting aberration (in particular, off-axial aberration). To avoid this, in the negative lens element constituting the first lens unit Gr1, the object-side surface is given a weak negative optical power or a positive optical power so that the lens element does not bend the rays incident thereon too sharply. Instead, the image-side surface, where the heights of off-axial rays are relatively small, is given a strong negative optical power. This makes it possible to correct off-axial aberration properly.

In a zoom lens system of a negative-positive-positive type, it is preferable that, as in all the embodiments, the first lens unit Gr1 be moved along the optical axis AX during zooming, and it is further preferable that the first lens unit Gr1 be a movable unit that fulfills conditional formula (3). In a negative-positive-positive type, the first lens unit Gr1 is the only lens unit that has a negative optical power, and therefore, if the first lens unit Gr1 is kept stationary during zooming, it is impossible to achieve zooming and back focal length adjustment with two positive lens units Gr2, Gr3 alone over the entire zoom range from the wide-angle end W to the telephoto end T. As a result, attempting to secure a zoom ratio of about 3× makes it difficult to secure satisfactory performance. By contrast, an arrangement that allows the first lens unit Gr1 to be moved along the optical axis AX during zooming makes it possible to realize a zoom lens system that offers higher performance. As described previously, it is preferable that the third lens unit Gr3 be kept stationary during zooming, and accordingly it is preferable that the first and the second lens units Gr1, Gr2 be moved along the optical axis AX during zooming, and it is further preferable that conditional formulae (3) and (4) be additionally fulfilled.

In all of the first to the sixth embodiments, all the lens units Gr1, Gr2, Gr3 are comprised solely of refractive lenses that deflect light incident thereon by refraction (i.e. lenses of the type that deflects light at the interface between two media having different refractive indices). However, any of these lens units may include, for example, a diffractive lens that deflects light incident thereon by diffraction, a refractive-diffractive hybrid lens that deflects light incident thereon by the combined effects of refraction and diffraction, a gradient-index lens that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the middle of the zoom lens system. Where to bend the optical path may be determined to suit particular needs. By bending the optical path appropriately, it is possible to make a camera apparently slimmer. It is even possible to build an arrangement in which zooming or the collapsing movement of a lens barrel does not cause any change in the thickness of a camera. For example, by keeping the first lens unit Gr1 stationary during zooming, and disposing a mirror behind the first lens unit Gr1 so that the optical path is bent by 90° by the reflecting surface of the mirror, it is possible to keep the front-to-rear length of the zoom lens system constant and thereby make a camera slimmer.

In all of the embodiments, an optical low-pass filter having the shape of a plane-parallel plate PL is disposed between the last surface of the zoom lens system and the image sensor SR. However, for this low-pass filter, it would also be possible to use a birefringence-type low-pass filter made of quartz or the like having its crystal axis aligned with a predetermined direction, a phase-type low-pass filter that achieves the required optical cut-off frequency characteristics by exploiting diffraction, or a low-pass filter of any other type.

Practical Examples

Hereinafter, practical examples of the construction of the zoom lens system used in taking lens devices embodying the present invention will be presented in more detail with reference to their construction data, aberration diagrams, and other data. Examples 1 to 6 presented below correspond to the first to the sixth embodiments, respectively, described hereinbefore, and the lens arrangement diagrams (FIGS. 1 to 6) showing the lens arrangement of the first to the sixth embodiments apply also to Examples 1 to 6, respectively.

Tables 1 to 6 list the construction data of Examples 1 to 6, respectively. In the construction data of each example, ri (where i=1, 2, 3, . . . ) represents the radius of curvature (mm) of the i-th surface from the object side, di (where i=1, 2, 3, . . . ) represents the i-th axial distance (mm) from the object side, and Ni (where i=1, 2, 3, . . . ) and vi (where i=1, 2, 3, . . . ) respectively represent the refractive index Nd for the d-line and the Abbe number vd of the i-th optical element from the object side. Moreover, in the construction data, for each of those axial distances that vary with zooming (i.e. variable aerial distances), three values are given that are, from left, the axial distance at the wide-angle end (at the shortest-focal-length end), W, the axial distance in the middle position (in the middle-focal-length position), M, and the axial distance at the telephoto end (at the longest-focal-length end), T. Also listed are the focal length f, (mm) and the f-number FNO of the entire optical system in those three focal-length positions W, M, and T. Table 7 lists the values of the conditional formulae as actually observed in Examples 1 to 6.

A surface whose radius of curvature ri is marked with an asterisk (*) is an aspherical surface, of which the surface shape is defined by formula (AS) below. The aspherical surface data of Examples 1 to 6 is also listed in their respective construction data.

$$X(H) = (C0 \cdot H^2)/\left(1 + \sqrt{1 - \varepsilon \cdot C0^2 \cdot H^2}\right) + \quad \text{(AS)}$$
$$(A4 \cdot H^4 + A6 \cdot H^6 + A8 \cdot H^8 + A10 \cdot H^{10})$$

where
  X(H) represents the displacement along the optical axis at the height H (relative to the vertex);
  H represents the height in a direction perpendicular to the optical axis;
  C0 represents the paraxial curvature (the reciprocal of the radius of curvature);
  $\varepsilon$ represents the quadric surface parameter; and
  Ai represents the aspherical surface coefficient of i-th order.

FIGS. 7A–7I, 8A–8I, 9A–9I, 10A–10I, 11A–11I, and 12A–12I are aberration diagrams of Examples 1 to 6, respectively. Of these diagrams, FIGS. 7A–7C, 8A–8C, 9A–9C, 10A–10C, 11A–11C, and 12A–12C show the aberration observed at the wide-angle end W, FIGS. 7D–7F, 8D–8F, 9D–9F, 10D–10F, 11D–11F, and 12D–12F show the aberration observed in the middle position M, and FIGS. 7G–7I, 8G–8I, 9G–9I, 10G–10I, 11G–11I, and 12G–12I show the aberration observed at the telephoto end T. Of these diagrams, FIGS. 7A, 7D, 7G, 8A, 8D, 8G, 9A, 9D, 9G, 10A, 10D, 10G, 11A, 11D, 11G, 12A, 12D, and 12G show spherical aberration, FIGS. 7B, 7E, 7H, 8B, 8E, 8H, 9B, 9E, 9H, 10B, 10E, 10H, 11B, 11E, 11H, 12B, 12E, and 12H show astigmatism, and FIGS. 7C, 7F, 7I, 8C, 8F, 8I, 9C, 9F, 9I, 10C, 10F, 10I, 11C, 11F, 11I, 12C, 12F, and 12I show distortion. In these diagrams, Y' represents the maximum image height (mm). In the diagrams showing spherical aberration, a solid line d and a dash-and-dot line g show the spherical aberration for the d-line and for the g-line, respectively, and a broken line SC shows the sine condition. In the diagrams showing astigmatism, a broken line DM and a solid line DS represent the astigmatism for the d-line on the meridional plane and on the sagittal plane, respectively. In the diagrams showing distortion, a solid line represents the distortion (%) for the d-line.

TABLE 1

Construction Data of Example 1 f = 2.0(W) ~ 4.1(M) ~ 5.9(T),
FNO = 2.25(W) ~ 3.23(M) ~ (T)

| Radius of Curvature | Axial Distance | Refractive Index | Abbe Number |
|---|---|---|---|
| r1* = −107.742 | d1 = 0.900 | N1 = 1.52200 | v1 = 52.20 |
| r2* = 2.650 | d2 = 5.664 ~ 1.855 ~ 0.700 | | |
| r3* = 2.260 | d3 = 2.950 | N2 = 1.58463 | v2 = 60.65 |
| r4* = −9.006 | d4 = 0.200 | | |
| r5 = ∞(ST) | d5 = 0.600 ~ 2.122 ~ 3.523 | | |
| r6* = −34.790 | d6 = 0.900 | N3 = 1.52200 | v3 = 52.20 |
| r7* = −8.387 | d7 = 0.900 | | |
| r8 = ∞ | d8 = 0.800 | N4 = 1.51680 | v4 = 64.20 |
| r9 = ∞ | | | |

Aspherical Surface Data of Surface r1

$\varepsilon$ = 1.0000, A4 = −0.59526 × 10$^{-3}$, A6 = 0.79652 × 10$^{-3}$,
A8 = −0.99127 × 10$^{-4}$,
A10 = 0.36916 × 10$^{-5}$ Aspherical Surface Data of Surface r2

$\varepsilon$ = 1.0000, A4 = −0.85719 × 10$^{-2}$, A6 = 0.33240 × 10$^{2}$,
A8 = −0.50517 × 10$^{3}$,
A10 = −0.34240 × 10$^{-5}$

TABLE 2

Construction Data of Example 2 f = 2.1 (W) ~ 4.1(M) ~ 5.9(T), FNO = 2.33(W) ~ 3.27(M) ~ 4.10(T)

| Radius of Curvature | Axial Distance | Refractive Index | Abbe Number |
|---|---|---|---|
| r1* = −25.504 | d1 = 0.900 | N1 = 1.52200 | v1 = 52.20 |
| r2* = −3.365 | d2 = 6.627 ~ 2.080 ~ 0.700 | | |
| r3* = 2.349 | d3 = 2.950 | N2 = 1.58463 | v2 = 60.65 |
| r4* = −10.912 | d4 = 0.200 | | |
| r5 = ∞(ST) | d5 = 0.600 ~ 2.011 ~ 3.319 | | |
| r6* = 44.100 | d6 = 0.900 | N3 = 1.52200 | v3 = 52.20 |
| r7* = −17.179 | d7 = 0.900 | | |
| r8 = ∞ | d8 = 0.800 | N4 = 1.51680 | v4 = 64.20 |
| r9 = ∞ | | | |

Aspherical Surface Data of Surface r1

$\varepsilon$ = 1.0000, A4 = 0.22803 × 10$^{-2}$, A6 = −0.26120 × 10$^{-3}$,
A8 = −0.40968 × 10$^{-4}$,
A10 = 0.14309 × 10$^{-5}$

TABLE 3

Construction Data of Example 3 f = 1.8(W) ~ 3.6(M) ~ 5.2(T),
FNO = 2.53(W) ~ 3.38(M) ~ 4.10(T)

| Radius of Curvature | Axial Distance | Refractive Index | Abbe Number |
|---|---|---|---|
| r1* = 41.173 | d1 = 0.800 | N1 = 1.52200 | v1 = 52.20 |
| r2* = 2.300 | d2 = 5.581 ~ 2.160 ~ 1.115 | | |
| r3* = 2.459 | d3 = 1.548 | N2 = 1.84666 | v2 = 23.82 |
| r4 = 1.275 | d4 = 1.476 | N3 = 1.58913 | v3 = 61.25 |
| r5* = −4.511 | d5 = 0.100 | | |
| r6 = ∞(ST) | d6 = 0.300 ~ 2.321 ~ 4.100 | | |
| r7* = 3.528 | d7 = 1.475 | N4 = 1.52200 | v4 = 52.20 |
| r8 = 10.000 | d8 = 0.682 | | |

TABLE 3-continued

Construction Data of Example 3

| | | | |
|---|---|---|---|
| r9 = ∞ | d9 = 0.700 | N5 = 1.51680 | ν5 = 64.20 |
| r10 = ∞ | | | |

TABLE 4

Construction Data of Example 4 f = 2.6(W)~5.3(M)~7.6(T), FNO = 2.11(W)~3.16(M)~4.10(T)

| Radius of Curvature | Axial Distance | Refractive Index | Abbe Number |
|---|---|---|---|
| r1* = −2882.841 | d1 = 0.900 | N1 = 1.52200 | ν1 = 52.20 |
| r2* = 3.640 | d2 = 7.362~2.100~0.500 | | |
| r3 = ∞(ST) | d3 = 0.200 | | |
| r4* = 3.011 | d4 = 4.820 | N2 = 1.62830 | ν2 = 57.19 |
| r5* = −17.224 | d5 = 0.800~2.701~4.446 | | |
| r6* = 5.250 | d6 = 0.900 | N3 = 1.52200 | ν3 = 52.20 |
| r7* = 7.217 | d7 = 0.153 | | |
| r8 = ∞ | d8 = 2.000 | N4 = 1.51680 | ν4 = 64.20 |
| r9 = ∞ | | | |

Aspherical Surface Data of Surface r1
$\epsilon = 1.0000$, $A4 = 0.52542 \times 10^{-2}$, $A6 = -0.30297 \times 10^{-3}$,
$A8 = 0.53519 \times 10^{-5}$, $A10 = 0.33330 \times 10^{-8}$
Aspherical Surface Data of Surface r2
$\epsilon = 1.0000$, $A4 = 0.36481 \times 10^{-2}$, $A6 = 0.63853 \times 10^{-3}$,
$A8 = -0.13617 \times 10^{-3}$, $A10 = 0.41867 \times 10^{-5}$
Aspherical Surface Data of Surface r4
$\epsilon = 1.0000$, $A4 = -0.27822 \times 10^{-2}$, $A6 = -0.18371 \times 10^{-3}$,
$A8 = 0.15600 \times 10^{-4}$, $A10 = -0.97961 \times 10^{-5}$
Aspherical Surface Data of Surface r5
$\epsilon = 1.0000$, $A4 = 0.12239 \times 10^{-1}$, $A6 = -0.41640 \times 10^{-1}$,
$A8 = 0.74534 \times 10^{-1}$, $A10 = -0.46732 \times 10^{-1}$
Aspherical Surface Data of Surface r6
$\epsilon = 1.0000$, $A4 = -0.25633 \times 10^{-1}$, $A6 = 0.56552 \times 10^{-2}$,
$A8 = -0.33719 \times 10^{-2}$, $A10 = 0.61951 \times 10^{-3}$
Aspherical Surface Data of Surface r7
$\epsilon = 1.0000$, $A4 = -0.18834 \times 10^{-1}$, $A6 = -0.10378 \times 10^{-2}$,
$A8 = -0.63473 \times 10^{-3}$, $A10 = 0.20297 \times 10^{-3}$

TABLE 5

Construction Data of Example 5 f = 4.0(W)~7.6(M)~11.5(T), FNO = 2.33(W)~3.17(M)~4.10(T)

| Radius of Curvature | Axial Distance | Refractive Index | Abbe Number |
|---|---|---|---|
| r1* = −9.955 | d1 = 1.000 | N1 = 1.52200 | ν1 = 52.20 |
| r2 = 3.882 | d2 = 1.783 | | |
| r3* = 7.244 | d3 = 1.223 | N2 = 1.84506 | ν2 = 23.66 |
| r4 = 14.492 | d4 = 9.395~3.158~0.800 | | |
| r5 = ∞(ST) | d5 = 0.200 | | |
| r6 = 4.804 | d6 = 3.998 | N3 = 1.75450 | ν3 = 51.57 |
| r7 = −6.783 | d7 = 1.301 | N4 = 1.84506 | ν4 = 23.66 |
| r8* = 23.120 | d8 = 2.610~6.724~11.204 | | |
| r9 = −93.799 | d9 = 2.187 | N5 = 1.52200 | ν5 = 52.20 |
| r10* = −7.186 | d10 = 0.649 | | |
| r11 = ∞ | d11 = 2.000 | N6 = 1.51680 | ν6 = 64.20 |
| r12 = ∞ | | | |

Aspherical Surface Data of Surface r1
$\epsilon = 1.0000$, $A4 = 0.28324 \times 10^{-2}$, $A6 = -0.14462 \times 10^{-3}$,
$A8 = 0.59416 \times 10^{-5}$, $A10 = -0.12027 \times 10^{-6}$
Aspherical Surface Data of Surface r3
$\epsilon = 1.0000$, $A4 = -0.39633 \times 10^{-3}$, $A6 = 0.67696 \times 10^{-4}$,
$A8 = -0.39694 \times 10^{-5}$, $A10 = 0.31518 \times 10^{-6}$
Aspherical Surface Data of Surface r8
$\epsilon = 1.0000$, $A4 = 0.33928 \times 10^{-2}$, $A6 = -0.53970 \times 10^{-4}$,

TABLE 5-continued

Construction Data of Example 5

$A8 = 0.12971 \times 10^{-3}$, $A10 = -0.14008 \times 10^{-4}$
Aspherical Surface Data of Surface r10
$\epsilon = 1.0000$, $A4 = 0.24389 \times 10^{-2}$, $A6 = -0.26132 \times 10^{-3}$,
$A8 = 0.31874 \times 10^{-4}$, $A10 = -0.16323 \times 10^{-5}$

TABLE 6

Construction Data of Example 6 f = 3.1(W)~6.2(M)~8.9(T), FNO = 1.94(W)~3.08(M)~4.10(T)

| Radius of Curvature | Axial Distance | Refractive Index | Abbe Number |
|---|---|---|---|
| r1* = −20.946 | d1 = 1.027 | N1 = 1.52200 | ν1 = 52.20 |
| r2* = 4.831 | d2 = 8.320~2.860~1.205 | | |
| r3* = 4.255 | d3 = 6.000 | N2 = 1.77188 | ν2 = 42.31 |
| r4 = −4.003 | d4 = 1.000 | N3 = 1.84506 | ν3 = 23.66 |
| r5* = −23.215 | d5 = 0.200 | | |
| r6 = ∞(ST) | d6 = 0.800~3.450~5.849 | | |
| r7* = 4.579 | d7 = 1.029 | N4 = 1.52200 | ν4 = 52.20 |
| r8* = 6.909 | d8 = 0.249 | | |
| r9 = ∞ | d9 = 2.200 | N5 = 1.51680 | ν5 = 64.20 |
| r10 = ∞ | | | |

Aspherical Surface Data of Surface r1
$\epsilon = 1.0000$, $A4 = 0.35135 \times 10^{-2}$, $A6 = -0.16331 \times 10^{-3}$,
$A8 = 0.36714 \times 10^{-5}$, $A10 = -0.30627 \times 10^{-7}$
Aspherical Surface Data of Surface r2
$\epsilon = 1.0000$, $A4 = 0.14769 \times 10^{-2}$, $A6 = 0.28048 \times 10^{-3}$,
$A8 = -0.39132 \times 10^{-4}$, $A10 = 0.12947 \times 10^{-5}$
Aspherical Surface Data of Surface r3
$\epsilon = 1.0000$, $A4 = -0.15278 \times 10^{-2}$, $A6 = 0.55644 \times 10^{-4}$,
$A8 = -0.58102 \times 10^{-5}$, $A10 = -0.29753 \times 10^{-6}$
Aspherical Surface Data of Surface r5
$\epsilon = 1.0000$, $A4 = -0.39872 \times 10^{-3}$, $A6 = 0.46257 \times 10^{-2}$,
$A8 = -0.30957 \times 10^{-2}$, $A10 = 0.22852 \times 10^{-3}$
Aspherical Surface Data of Surface r7
$\epsilon = 1.0000$, $A4 = -0.51770 \times 10^{-2}$, $A6 = -0.22711 \times 10^{-2}$,
$A8 = 0.35648 \times 10^{-3}$, $A10 = -0.24612 \times 10^{-4}$
Aspherical Surface Data of Surface r8
$\epsilon = 1.0000$, $A4 = 0.24581 \times 10^{-2}$, $A6 = -0.54894 \times 10^{-2}$,
$A8 = 0.84949 \times 10^{-3}$, $A10 = -0.48582 \times 10^{-4}$

TABLE 7

Actual Values of Conditional Formulae

| | Conditional Formula (1) $tW_{2-3}/fW$ | Conditional Formula (2) $f3/fW$ | Conditional Formula (3) $tl/Y'$ | Conditional Formula (4) $t2/Y'$ |
|---|---|---|---|---|
| Example 1 | 0.39 | 10.21 | 0.69 | 2.25 |
| Example 2 | 0.39 | 11.61 | 0.69 | 2.25 |
| Example 3 | 0.22 | 5.38 | 0.61 | 2.31 |
| Example 4 | 0.30 | 12.13 | 0.50 | 2.68 |
| Example 5 | 0.65 | 3.70 | 1.78 | 2.36 |
| Example 6 | 0.33 | 7.41 | 0.46 | 3.12 |

What is claimed is:
1. An optical device comprising:
a zoom lens system; and
an image sensor for converting an optical image formed by said zoom lens system into an electrical signal;
wherein said zoom lens system comprises, from an object side thereof to an image side thereof, a first lens unit having a negative optical power, a second lens unit having a positive optical power, and a third lens unit having a positive optical power;
wherein said zoom lens system achieves zooming by varying unit-to-unit distances;

wherein each of said first lens unit, said second lens unit, and said third lens unit is comprised of a single lens element;

wherein at least said first lens unit and said second lens unit are moved along an optical axis during zooming, and the following conditional formula is fulfilled:

$$0.2 < tW_{2-3}/fW < 1.2$$

where $tW_{2-3}$ represents an optical path length from a most image-side lens surface in said second lens unit to a most object-side lens surface in said third lens unit at a wide-angle end; and fW represents a focal length of the entire zoom lens system at the wide-angle end.

2. An optical device as claimed in claim 1, wherein said third lens unit is kept stationary during zooming, and the following conditional formula is fulfilled:

$$7 < f3/fW < 20$$

where f3 represents a focal length of said third lens unit; and
fW represents a focal length of the entire zoom lens system at the wide-angle end.

3. An optical device as claimed in claim 2, wherein the following conditional formulae are additionally fulfilled:

$$0.2 < t1/Y' < 1.2$$

$$1 < t2/Y' < 4$$

where t1 represents an axial thickness of said first lens unit from a most object-side lens surface thereof to a most image-side lens surface thereof;

t2 represents an axial thickness of said second lens unit from a most object-side lens surface thereof to a most image-side lens surface thereof; and Y' represents a maximum image height.

4. An optical device as claimed in claim 1, wherein the following conditional formulae are additionally fulfilled:

$$0.2 < t1/Y' < 1.2$$

$$1 < t2/Y' < 4$$

where t1 represents an axial thickness of said first lens unit from a most object-side lens surface thereof to a most image-side lens surface thereof;

t2 represents an axial thickness of said second lens unit from a most object-side lens surface thereof to a most image-side lens surface thereof; and Y' represents a maximum image height.

5. An optical device as claimed in claim 1 wherein the zoom lens system further comprises a low pass filter which adjusts spatial frequency characteristics of the optical image formed by the zoom lens system, said low pass filter located between the last surface of said zoom lens system and said image sensor.

6. An optical device as claimed in claim 5 wherein said low-pass filter remains stationary during zooming.

7. An optical device comprising:
a zoom lens system; and
an image sensor for converting an optical image formed by the zoom lens system into an electrical signal;

wherein said zoom lens system comprises, from an object side thereof to an image side thereof, a first lens unit having a negative optical power, a second lens unit having a positive optical power, and a third lens unit having a positive optical power;

wherein said zoom lens system comprises four or less lens elements having an optical power;

wherein said zoom lens system achieves zooming by varying unit-to-unit distances;

wherein at least said first lens unit and said second lens unit are moved along an optical axis during zooming, and the following conditional formula is fulfilled:

$$7 < f3/fW < 20$$

where f3 represents a focal length of said third lens unit; and
fW represents a focal length of the entire zoom lens system at a wide-angle end.

8. An optical device as claimed in claim 7, wherein said third lens unit is kept stationary during zooming.

9. An optical device as claimed in claim 8, wherein said first lens unit is comprised of one negative lens element having a sharp curvature toward an image side, and the following conditional formula is fulfilled:

$$0.2 < t1/Y' < 1.2$$

where t1 represents an axial thickness of said first lens unit from a most object-side lens surface thereof to a most image-side lens surface thereof; and Y' represents a maximum image height.

10. An optical device as claimed in claim 7 wherein said first lens unit comprises at least one negative lens element.

11. An optical device as claimed in claim 7 wherein said second lens unit comprises one negative lens element and one positive lens element adhered together.

12. An optical device as claimed in claim 7 wherein said second lens unit comprises at least one positive lens element.

13. An optical device as claimed in claim 7, wherein said first lens unit is comprised of one negative lens element having a sharp curvature toward an image side, and the following conditional formula is fulfilled:

$$0.2 < t1/Y' < 1.2$$

where t1 represents an axial thickness of said first lens unit from a most object-side lens surface thereof to a most image-side lens surface thereof; and Y' represents a maximum image height.

14. An optical device as claimed in claim 7 wherein the zoom lens system further comprises a low pass filter which adjusts spatial frequency characteristics of the optical image formed by the zoom lens system, said low pass filter located between the last surface of said zoom lens system and said image sensor.

15. An optical device as claimed in claim 14 wherein said low-pass filter remains stationary during zooming.

16. An optical device comprising:
a zoom lens system; and an image sensor for converting an optical image formed by the zoom lens system into an electrical signal, wherein said zoom lens system comprises, from an object side thereof to an image side thereof, a first lens unit having a negative optical power, a second lens unit having a positive optical power, and a third lens unit having a positive optical power;

wherein said zoom lens system achieves zooming by varying unit-to-unit distances;

wherein said first lens unit comprises one negative lens element having a sharp curvature toward an image side, and the following conditional formula is fulfilled:

$$0.2 < t1/Y' < 1.2$$

where t1 represents an axial thickness of said first lens unit from a most object-side lens surface thereof to a most image-side lens surface thereof; and Y' represents a maximum image height.

17. An optical device as claimed in claim 16,
wherein said first lens unit is moved along an optical axis during zooming.

18. An optical device as claimed in claim 17,
wherein the following conditional formula is additionally fulfilled:

$$1 < t2/Y' < 4$$

where t2 represents an axial thickness of said second lens unit from a most object-side lens surface thereof to a most image-side lens surface thereof; and Y' represents a maximum image height.

19. An optical device as claimed in claim 16 wherein said third lens unit is stationary during zooming.

20. An optical device as claimed in claim 16,
wherein the following conditional formula is additionally fulfilled:

$$1 < t2/Y' < 4$$

where t2 represents an axial thickness of said second lens unit from a most object-side lens surface thereof to a most image-side lens surface thereof; and Y' represents a maximum image height.

21. An optical device as claimed in claim 16 wherein the zoom lens system further comprises a low pass filter which adjusts spatial frequency characteristics of the optical image formed by the zoom lens system, said low pass filter located between the last surface of said zoom lens system and said image sensor.

22. An optical device as claimed in claim 21 wherein said low-pass filter remains stationary during zooming.

23. An optical device comprising:

a zoom lens system; and an image sensor for converting an optical image formed by said zoom lens system into an electrical signal;

wherein said zoom lens system comprises, from an object side thereof to an image side thereof; a first lens unit having a negative optical power, a second lens unit having a positive optical power, and a third lens unit having a positive optical power;

wherein said zoom lens system achieves zooming by varying unit-to-unit distances; and wherein at least said first lens unit and said second lens unit are moved along an optical axis during zooming, and the following conditional formula is fulfilled:

$$0.2 < tW_{2-3}/fW < 1.2$$

where $tW_{2-3}$ represents an optical path length from a most image-side lens surface in said second lens unit to a most object-side lens surface in said third lens unit at a wide-angle end; and fW represents a focal length of the entire zoom lens system at the wide-angle end.

24. An optical device as claimed in claim 23,
wherein said third lens unit is kept stationary during zooming, and the following conditional formula is fulfilled:

$$7 < f3/fW < 20$$

where f3 represents a focal length of said third lens unit; and fW represents a focal length of the entire zoom lens system at the wide-angle end.

25. An optical device as claimed in claim 23, wherein the following conditional formulae are additionally fulfilled:

$$0.2 < t1/Y' - 1.2$$

$$1 < t2/Y' < 4$$

where t1 represents an axial thickness of said first lens unit from a most object-side lens surface thereof to a most image-side lens surface thereof;

t2 represents an axial thickness of said second lens unit from a most object-sided lens surface thereof to a most image-sided lens surface thereof; and Y' represents a maximum image height.

* * * * *

UNITED STATES PATENT AND TRADEMARK OFFICE
CERTIFICATE OF CORRECTION

PATENT NO.   : 6,621,642 B2
DATED         : September 16, 2003
INVENTOR(S) : Hitoshi Hagimori It is certified that error appears in the above-identified patent and that said Letters Patent is hereby corrected as shown below:

Column 1,
Line 14, delete "ex ample,", and insert -- example --.
Line 36, after "or", insert -- the --.
Line 38, delete "Laid Open Open" and insert -- Laid-Open --.
Line 41, delete "object t", and insert -- object --.

Column 2,
Line 37, delete "systems" and insert -- system --.

Column 3,
Line 22, after "invention", insert -- ; --.

Column 4,
Line 33, after "surface", delete ",", and insert -- ; --.
Line 56, delete "thereof This", and insert -- thereof. This --.

Column 5,
Line 9, delete "itself The", and insert -- itself. The --.

Column 7,
Line 2, after the second occurrence of "the", delete ",".

Column 9,
Line 6, delete "vi", and insert -- vi --.
Line 8, delete "vd", and insert -- vd --.

Column 10,
Line 6, delete "FNO=2.25(W)~3.23(M)~(T)", and insert -- FNO=2.25(W)~3.23(M)~4.10(T) --.
Line 11, Under the heading "Abbe Number", delete "v1=52.20", and insert -- $\nu$1=52.20 --.
Line 13, Under the heading "Abbe Number", delete "v2=60.65", and insert -- $\nu$2=60.65 --.
Line 16, Under the heading "Abbe Number", delete "v3=52.20", and insert -- $\nu$3=52.20 --.
Line 18, Under the heading "Abbe Number", delete "v4=64.20", and insert -- $\nu$4=64.20 --.
Line 48, after "A10= –0.34240x $10^{-5}$", insert the following data titles and formulae contained thereunder:
--Aspherical Data of Surface r2
$\varepsilon$=1.0000, A4= –0.18627×$10^{-2}$, A6= 0.25620×$10^{-2}$, A8= –0.43273×$10^{-3}$, Al 0= 0.21372×$10^{-4}$ --.
--Aspherical Surface Data of Surface r3
$\varepsilon$=1.0000, A4= –0.49962×$10^{-2}$, A6=–0.28256×$10^{-2}$, A8= 0.27733×$10^{-2}$, A10=

UNITED STATES PATENT AND TRADEMARK OFFICE
CERTIFICATE OF CORRECTION

PATENT NO. : 6,621,642 B2
DATED : September 16, 2003
INVENTOR(S) : Hitoshi Hagimori It is certified that error appears in the above-identified patent and that said Letters Patent is hereby corrected as shown below:

$-0.93792 \times 10^{-3}$ --.

Column 10 (cont'd),
--Aspherical Surface Data of Surface r4
$\varepsilon=1.0000$, A4= $0.18424 \times 10^{-1}$, A6= $-0.15907 \times 10^{-1}$, A8= $0.15610 \times 10^{-1}$ --.
--Aspherical Surface Data of Surface r6
$\varepsilon=1.0000$, A4= $0.17132 \times 10^{-3}$, A6= $-0.19835 \times 10^{-1}$, A8=$0.28162 \times 10^{-1}$, A10= $-0.82423 \times 10^{-2}$ --.
--Aspherical Surface Data of Surface r7
$\varepsilon=1.0000$, A4= $0.19222 \times 10^{-1}$, A6=$-0.18263 \times 10^{-1}$, A8= $0.11674 \times 10^{-1}$ --.
Line 59, delete "vl = 52.20", and insert -- $v1 = 52.20$ --.
Line 62, delete "v2 = 23.82", and insert -- $v2 = 23.82$ --.
Line 63, delete "v3 = 61.25", and insert -- $v3 = 61.25$ --.
Line 66, delete "v4 = 52.20", and insert -- $v4 = 52.20$ --.

Column 11,
Line 4, delete "v5 = 64.20", and insert -- $v5 = 64.20$ --.
Line 4, after "v5=64.20", insert -- Aspherical Data of Surface rl,
$\varepsilon=1.0000$, A4= $0.93523 \times 10^{-2}$, A6= $0.83180 \times 10^{-3}$, A8= $-0.17879 \times 10^{-3}$, Al0= $0.69474 \times 10^{-5}$ --.
(Table 3), after the previous correction of "A 10= $0.69474 \times 10^{-5}$", insert the following descriptive data title and the formula contained thereunder:
-- Aspherical Surface Data of Surface r2
$\varepsilon=1.0000$, A4= $0.15659 \times 10^{-1}$, A6= $0.66930 \times 10^{-4}$, A8= $0.46151 \times 10^{-2}$, A 10= $-0.97076 \times 10^{-3}$ --.
Aspherical Surface Data of Surface r3
$\varepsilon=1.0000$, A4= $-0.73886 \times 10^{-2}$, A6= $0.1533\ 7 \times 10^{-1}$, A8= $-0.27111 \times 10^{-1}$, A 10= $0.18455 \times 10^{-1}$ --.
--Aspherical Surface Data of Surface r5
$\varepsilon=1.0000$, A4= $-0.28121 \times 10^{-1}$, A6= $0.60559 \times 10^{-1}$, A8= $-0.83578 \times 10^{-1}$, A10= $0.39977 \times 10^{-1}$ --.
"Asherical Surface Data of Surface r7
$\varepsilon=1.0000$, A4= $-0.49475 \times 10^{-2}$, A6= $-0.48949 \times 10^{-2}$, A8= $0.40356 \times 10^{-2}$, A 10= $-0.73122 \times 10^{-3}$ --.
Line 16, delete "vl = 52.20", and insert -- $vl = 52.20$ --.
Line 19, delete "v2 = 57.19", and insert -- $v2 = 5\ 7.19$ --.
Line 22, delete "v3 = 52.20", and insert -- $v3 = 52.20$ --.
Line 24, delete "v4 = 64.20", and insert -- $v4 = 64.20$ --.
Line 49, delete "vl = 52.20", and insert -- $vl = 52.20$ --.
Line 51, delete "v2 = 23.66", and insert -- $v2 = 23.66$ --.

UNITED STATES PATENT AND TRADEMARK OFFICE
CERTIFICATE OF CORRECTION

PATENT NO. : 6,621,642 B2
DATED : September 16, 2003
INVENTOR(S) : Hitoshi Hagimori It is certified that error appears in the above-identified patent and that said Letters Patent is hereby corrected as shown below:

Line 53, delete "v3 = 51.57", and insert -- v3 = 51.5 7 --.

Column 11 (cont'd),
Line 54, delete "v4 = 23.66", and insert -v4 = 23.66 --.
Line 57, delete "v5 = 52.20", and insert -- v5 = 52.20 --.
Line 59, delete "v6 = 64.20", and insert -v6 = 64.20 --.

Column 12,
Line 16, delete "v 1 = 52.20", and insert -- vl = 52.20 --.
Line 18, delete "v2 = 42.31 ", and insert -- v2 = 42.31 --.
Line 19, delete "v3 = 23.66", and insert -- 23.66 --.
Line 22, delete "v4 = 52.20", and insert -v4 = 52.20 --.
Line 24, delete "v5 = 64.20", and insert -v5 = 64.20 --.

Column 16,
Line 42, delete "0.2< t1/Y'-1.2", and insert -- 0.2< tl/Y'< 1.2 --.

Signed and Sealed this

Tenth Day of August, 2004

JON W. DUDAS
*Acting Director of the United States Patent and Trademark Office*